United States Patent [19]

Fryd

[11] Patent Number: 4,588,804

[45] Date of Patent: May 13, 1986

[54] POLYIMIDE COMPOSITIONS

[75] Inventor: Michael Fryd, Haddonfield, N.J.

[73] Assignee: E. I. Du Pont de Nemours and Company, Wilmington, Del.

[21] Appl. No.: 607,290

[22] Filed: May 4, 1984

[51] Int. Cl.[4] .............................................. C08G 73/10
[52] U.S. Cl. ..................................... 528/125; 528/126; 528/128; 528/172; 528/185; 528/188; 528/189; 528/208; 528/220; 528/229; 528/352; 528/353
[58] Field of Search ............... 528/125, 126, 128, 172, 528/185, 188, 189, 208, 352, 353, 220, 229

[56] References Cited

U.S. PATENT DOCUMENTS

| | | | |
|---|---|---|---|
| 3,356,648 | 12/1967 | Rogers | 528/353 |
| 3,649,601 | 3/1972 | Critchley et al. | 528/353 |
| 3,666,709 | 5/1972 | Suzuki et al. | 528/353 |
| 3,817,927 | 6/1974 | Kovacs et al. | 528/353 |
| 3,959,350 | 5/1976 | Rogers | 528/353 |
| 4,111,906 | 9/1978 | Jones et al. | 528/353 |
| 4,336,175 | 6/1982 | Gibbs | 528/353 |

Primary Examiner—Lester L. Lee

[57] ABSTRACT

A soluble polyimide derived from dehydration of a polyamic acid which is the liquid phase condensation reaction product of a solution in aprotic solvent of approximately equimolar amounts of aromatic dianhydride and aromatic diamine. At least 50 mole % of the dianhydride must have ring linkages which prevent conjugation between the rings and at least 20 mole % of the diamine must contain electron withdrawing groups.

17 Claims, No Drawings

POLYIMIDE COMPOSITIONS

FIELD OF THE INVENTION

The invention is directed to polyimide compositions, especially those which are soluble.

BACKGROUND OF THE INVENTION

Polyimides find extensive use in electronic applications where they are useful in forming dielectric films on electrical and electronic devices such as capacitors and semiconductors. Typical uses for polyimides include protective coatings for semiconductors, dielectric layers for multilayer integrated circuits, high temperature solder masks, bonding multilayer circuits, final passivating coatings on electrical electronic devices and the like.

It is well known in the polymer art to make thermally stable all-aromatic polyimides by the condensation polymerization of dianhydrides and diamines to form polyamic acid. Such polyimide precursors are disclosed inter alia in U.S. Pat. No. 3,179,634 to Edwards. These polyamic acids are readily dehydrated to the corresponding polyimides by heating at high temperatures, e.g. 300° to 400° C. However, these all-aromatic polyimides known heretofore have all been insoluble and, therefore, protective films could not be coated in the polyimide form. Therefore, it has been prior practice to use instead the precursor polyamic acids which had the advantage of being readily soluble in many aprotic solvents. Such polyamic acid solutions were then coated to form the appropriate film and converted to the corresponding polyimide by heating the film at high temperature to effect volatilization of the solvent and dehydration of the polyamic acid to form the polyimide. However, polyamic acid solutions tend to have substantial viscosity instability which causes them to become lower in viscosity upon storage at room temperature. Therefore, it would be advantageous to have an already formed soluble polyimide which is viscosity stable and, because it requires no conversion, can be processed at relatively low temperatures, e.g., below 200° C.

BRIEF DESCRIPTION OF THE INVENTION

To overcome the insolubility disadvantages of prior art polyimides, the invention is directed to polyimide compositions which are in fact soluble in aprotic solvents and therefore may be marketed as fully imidized polymers in solution form without the necessity of dehydrating a precursive polyamic acid. More particularly, the invention is directed in its primary aspect to an aprotic solvent-soluble polyimide composition derived from dehydration of a polyamic acid which is the liquid phase condensation reaction product of a solution in aprotic solvent of approximately equimolar amounts of aromatic dianhydride and aromatic diamine consisting essentially of:

I. A dianhydride reactant wherein
(a) 50-100 mole % of the dianhydride reactant corresponds to the formula:

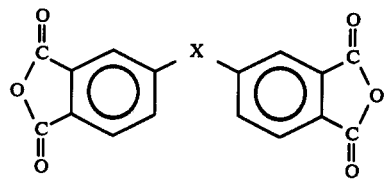

in which X is a divalent moiety which prevents conjugation between the anhydride-bearing ring and which contains no aliphatic carbon-carbon or carbon-hydrogen bonds;
(b) 50-0 mole % of the dianhydride reactant corresponds to the formula:

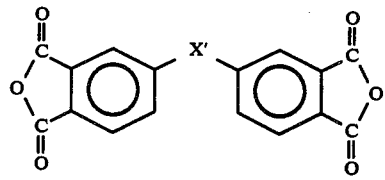

in which X' is a divalent moiety containing no aliphatic carbon-carbon or carbon-hydrogen bonds; and II. A diamine reactant wherein
(c) 20-100 mole % of the diamine reactant corresponds to the formulae:

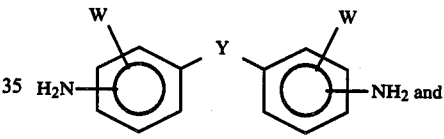

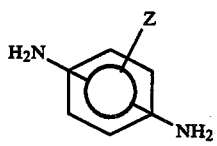

in which at least one of W and Y or mixtures thereof is an electron withdrawing moiety or precursor thereof containing no aliphatic carbon-carbon or carbon-hydrogen bond and Z is either W or H; and
(d) 80-0 mole % of the diamine reactant corresponds to the formula:

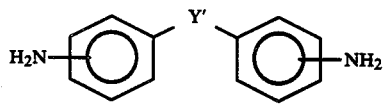

in which Y' is a nonelectron withdrawing moiety.

In a secondary aspect, the invention is directed to a method of making the above-described soluble polyimides comprising the steps of:
(a) forming a uniform solution in aprotic solvent of approximately equimolar amounts of aromatic dianhydride and aromatic diamine consisting essentially of:
I. A dianhydride reactant wherein
(1) 50-100 mole % of the dianhydride reactant corresponds to the formula:

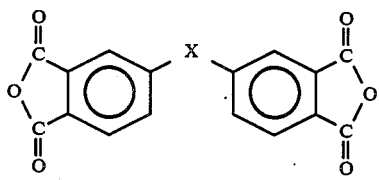

in which X is a divalent moiety which prevents conjugation between the anhydride-bearing ring and which contains no pi electrons and no aliphatic carbon-carbon or carbon-hydrogen bonds;

(2) 50–0 mole % of the dianhydride reactant corresponds to the formula:

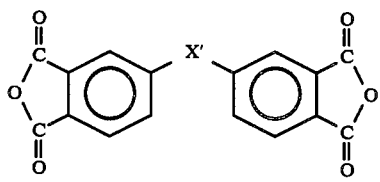

in which X' is a divalent moiety containing no aliphatic carbon-carbon or carbon-hydrogen bonds; and II. A diamine reactant wherein
(3) 20–100 mole % of the diamine reactant corresponds to the formulae:

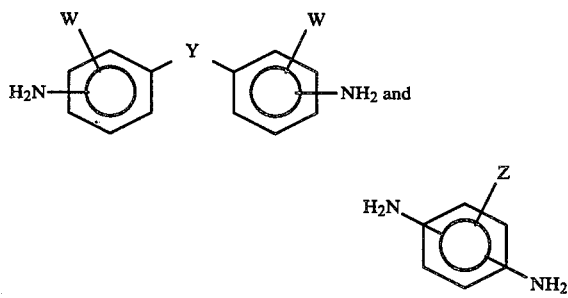

in which at least one of W and Y is an electron withdrawing moiety or precursor thereof containing no aliphatic carbon-carbon or carbon-hydrogen bonds and Z is either W or H; and (4) 80–0 mole % of the diamine reactant corresponds to the formula:

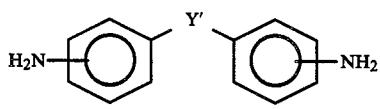

in which Y' is a nonelectron withdrawing moiety, whereby the dianhydride reactant and diamine reactant coreact to form polyamic acid; and (b) adjusting the temperature of the reaction solution to 160°–200° C. to effect dehydration of the polyamic acid and formation of the corresponding polyimide.

In a still further aspect, the invention is directed to a method for making films of the above-described soluble polyimides comprising the sequential steps of (a) forming a layer of aprotic solvent solution of the polyimide described above, and (b) heating the cast layer of step (a) at a temperature and for a time sufficient to effect removal of the solvent by evaporation.

DETAILED DESCRIPTION OF THE INVENTION

The preparation of polyamic precursors of polyimide is carried out by condensation polymerization of the dianhydrides and diamines in an aprotic solvent medium. Suitable aprotic solvents are N-methyl pyrrolidone, dimethylacetamide, dimethyl sulfoxide and dimethylformamide. N-methyl pyrrolidone is a particularly preferred solvent for use in the invention. Mixtures of the solvents can be used as well to adjust the volatility of the solvent medium. The solvent should, however, be substantially free of water to avoid the formation of reaction by-products with the dianhydride reactants. Solvents having a water content of no more than 0.1% wt. are preferred.

Upon admixing the reactants, the formation of polyamic acid by polycondensation reaction of the dianhydrides and diamines takes place quite readily at room temperature. Because the reaction is exothermic, the temperature of any batch reaction system tends to be raised substantially. For this reason it is normal practice to form a solution of one of the reactants in the solvent and then slowly add the other reactant to the solution in order to control the temperature of the reaction. However, this procedure is not essential, especially in view of the fact that the process of the invention requires heating of the reaction mixture to effect dehydration of the reaction solution to form the imide form of the condensation polymer. Nevertheless, it is preferred to form a solution of the diamine in the aprotic solvent and then add the dianhydride because of (1) the lower solubility of the dianhydride in aprotic solvents, and (2) the tendency of the dianhydrides to react with trace amounts of water in the solvent.

It will ordinarily be preferred that approximately equimolar proportions of the reactants be used in the reaction system in order that adequate polymer molecular weight can be obtained. For this reason, neither the dianhydride/diamine ratio nor the diamine/dianhydride ratio should be less than 0.95. Within these approximately equimolar proportions, it is possible to obtain strong high molecular weight polyimides having an intrinsic viscosity (IV) of 0.7–0.8 as measured in N-methyl pyrrolidone at 25° C. Within the above-described limits, effective control of molecular weight can be obtained and molecular weight distribution is more narrow. Outside of the preferred stoichiometric range, molecular weights become too low and a wide range of molecular weight distribution is obtained.

On the other hand, the concentration of the reactants in the solvent is not at all critical. Polymer solutions with concentrations as much as 50% wt. solids can be prepared. However, it may be preferable to use solutions with 15–30% wt. solids to avoid excessively high viscosities, especially if quite high molecular weight polyimides are made. Obviously, smaller concentrations of reactants can be used, but they are not preferred because of the practical disadvantages related to removal of large quantities of solvent from the polyimide product.

To obtain thermally stable soluble polyimides by the process of the invention, it is essential that all of the reactants be aromatic. In addition, at least 50 mole % of the dianhydride reactant must contain inter-ring linkages which are of proper configuration and composition to prevent conjugation between the two aromatic rings of the dianhydride. This criterion is met in general if the linkage contains no pi electrons. However, the linkage can in some instances contain p electrons e.g., O or S atoms, and still meet the criterion of preventing conjugation of the aromatic rings of the dianhydride. In addition, it is preferred that the ring linkage contain no aliphatic carbon-carbon or carbon-hydrogen bonds

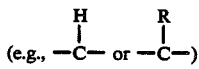

lest the resultant polymers have insufficient thermal stability. Despite the fact that 50 mole % dianhydrides which do not meet these criteria can be used, it is nevertheless preferred that at least 80 mole % of the dianhydrides meet these criteria.

Suitable linkages for the dianhydride aromatic rings (X) which do prevent ring conjugation include

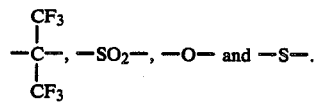

On the other hand, up to 50 mole % of the anhydrides can contain pi electrons so long as the ring linkage (X') does not also contain aliphatic carbon-carbon or carbon-hydrogen bonds. Thus,

is quite suitable, but

is not because it has insufficient thermal stability.

A further criterion, which is needed to obtain suitable soluble polyimides, is that at least 20 mole % of the diamines contain electron withdrawing groups. These groups, which increase the ionization potential of the diamine, can be on the linkage between the rings of the diaromatic diamines (Y) or on the rings of either diaromatic or monoaromatic diamines (W). Suitable ring-linking electron withdrawing groups (Y) include

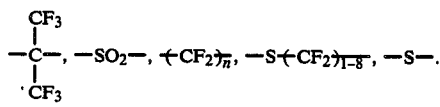

Suitable ring-substitutable electron withdrawing groups (W) include

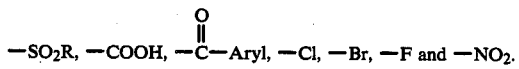

The composition and size of the Aryl groups on the ring-substituted

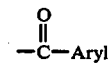

groups is not critical. The aromatic ring can be substituted or unsubstituted and can be polycyclic as well. However, such rings should not contain aliphatic carbon-carbon or carbon-hydrogen bonds.

It is also possible to use diamines having Y or W groups which, while not per se electron withdrawing in nature, nevertheless form electron withdrawing groups upon reaction with the dianhydrides. For this reason, monocyclic diamines such as m-phenylenediamine which contains no electron withdrawing groups, is nevertheless effective for use in the invention.

Though it is preferred that at least 50 mole % of the diamine contain electron withdrawing groups, as much as 80 mole % of the diamine reactants can be without electron withdrawing groups. Inter-ring linkages without electron withdrawing groups include —O—, —S—,

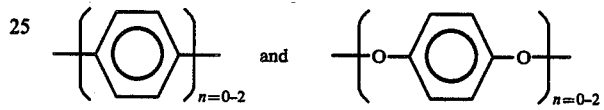

It is particularly preferred that 100% of the diamine contain electron withdrawing groups.

Because of the solubility of the polyimides of the invention, they can be stored for extended periods of time in solution form. In fact, the above-described reaction solutions are sufficient for this purpose either with or without changing the solvent content to adjust the solution viscosity. Films or coatings of the polyimides of the invention are readily made by coating, e.g., by spinning, spraying or casting, the polyimide solution onto an appropriately inert substrate and then heating the solution to evaporate the solvent(s). Ordinarily the solvent removal will be carried out at 180°–250° C., depending on the volatility of the solvent. However, the solvent can be removed more rapidly by heating at temperatures as high as 500°–550° C. for very short intervals or at 400° C. for more extended periods of time. In any case, it is essential to carry out this step without incurring any significant decomposition of either the solvent or the polyimide since the structural integrity of the polymer is so important in many electronic applications, especially dielectric uses.

The invention can be better understood by reference to the following examples:

EXAMPLES

Example 1

A soluble polyimide was prepared by adding 15.2 g (0.1 mole) of 3,5-diaminobenzoic acid (DBA) to 240 g of N-methyl pyrrolidone (NMP) in a 500 ml three-neck round-bottom flask equipped with a mechanical stirrer, thermometer, Dean-Stark trap, condenser and an inlet for nitrogen gas. The admixture was stirred at room temperature until all of the diamine was dissolved. To this solution were slowly added 44.4 g (0.1 mole) of 2,2-bis(3,4-benzene-dicarboxylic acid anhydride)perfluoro propane (6FDA) over the course of about 30 minutes. The contents of the flask were stirred for 2 hours. At the end of this time, 30 g of xylene were added to the reaction solution and it was heated to 180° C. and maintained at that temperature for 4 hours, during which 4.2 g of water (117% theoretical) were collected. Upon cooling down to room temperature, a portion of the reaction solution, which was a clear brown viscous material, was cast onto a glass plate and leveled off with a doctor blade. Upon heating the liquid film for 30 minutes at 200° C. to remove the solvent, the resulting film was tough and flexible and could be creased without cracking.

Examples 2–17

Sixteen additional polymers of different composition were prepared in the same manner as Example 1 from the monomeric reactants listed in Table 1 below. A Glossary of Abbreviations is also given below:

TABLE I

| Ex. No. | Monomer Composition | Quantity g (mole) | Solvent NMP Quantity g | Rate of Dehydration Recovered g | % Theoretical |
|---|---|---|---|---|---|
| 2 | 6FDA MPD | 44.4 (0.1) 10.8 (0.1) | 220 | 4.3 | 119 |
| 3 | 6FDA DAS | 44.4 (0.1) 4.4 (0.1) | 280 | 4.6 | 128 |
| 4 | 6FDA ATPPO | 44.4 (0.1) 64.8 (0.1) | 440 | 5.1 | 142 |
| 5 | 6FDA DAS ODA | 44.4 (0.1) 12.4 (0.05) 10.0 (0.05) | 270 | 4.3 | 119 |
| 6 | 6FDA MPD ODA | 44.4 (0.1) 8.6 (0.08) 4.0 (0.02) | 230 | 4.2 | 116 |
| 7 | 6FDA BTDA DAS | 22.2 (0.05) 16.1 (0.05) 24.8 (0.1) | 250 | 4.4 | 122 |
| 8 | 6FDA BTDA DAS ODA | 22.2 (0.05) 16.1 (0.05) 12.4 (0.05) 10.0 (0.05) | 240 | 4.6 | 128 |
| 9 | 6FDA BABDE | 44.4 (0.1) 40.8 (0.1) | 340 | 4.8 | 133 |
| 10 | BTDA DAS | 32.2 (0.1) 24.8 (0.1) | 300 | — | — |
| 11 | PMDA DAS | 21.8 (0.1) 24.8 (0.1) | 300 | — | — |
| 12 | BTDA DAMBA | 32.2 (0.1) 15.2 (0.1) | 300 | — | — |
| 13 | PMDA DAMBA | 21.8 (0.1) 15.2 (0.1) | 300 | — | — |
| 14 | 6FDA ODA | 44.4 (0.1) 20.0 (0.1) | 300 | — | — |
| 15 | 6FDA 6FDAm | 44.4 (0.1) 33.4 (0.1) | 350 | 4.6 | 12.8 |
| 16 | PMDA ODA | 21.8 (0.1) 20.0 (0.1) | 300 | — | — |
| 17 | BTDA ODA | 32.2 (0.1) 20.0 (0.1) | 300 | — | — |

The polyimides of Examples 2–9 and 15 were all soluble and produced good quality films. However, the polymers of Examples 10–14 and 16–17 were not soluble and they precipitated out when the reaction solution was dehydrated. In Examples 10–13, 16 and 17, the polymers were insoluble because of conjugation between the two anhydride groups of each dianhydride. In Examples 14, the polymer was insoluble because the diamine component did not contain an electron withdrawing group.

| Glossary of Abbreviations | |
|---|---|
| Abbreviation | Name of Compound |
| Dianhydrides | |
| 6FDA | 2,2-bis(3,4-benzenedicarboxylic acid anhydride) perfluoropropane |
| BTDA | benzophenone tetracarboxylic acid dianhydride |
| PMDA | pyromellitic dianhydride |
| Diamines | |
| MPD | m-phenylene diamine |
| DAS | diaminosulfone |
| ATPPO | 1,8-bis(4-aminothiophenoxy) perfluoroctane |
| ODA | oxydianiline |
| BABDE | 4,4'bis(p-aminobenzoyldiphenyl ether) |
| DAMBA | 3,5-diaminobenzoic acid |
| 6FDAm | 2,2-bis(p-dianiline)perfluoropropane |

I claim:

1. A polyimide derived from dehydration of a polyamic acid which is the liquid phase condensation reaction product of a solution in aprotic solvent of approximately equimolar amounts of aromatic dianhydride and aromatic diamine consisting essentially of:
   (1) A dianhydride reactant wherein
      a. 50–100 mole % of the dianhydride reactant corresponds to the formula:

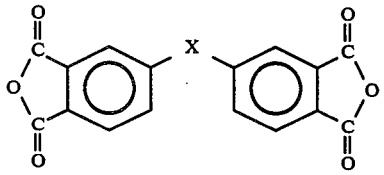

in which X is a 2,2-perfluoropropylene moiety;
      b. 50–0 mole % of the dianhydride reactant corresponds to the formula:

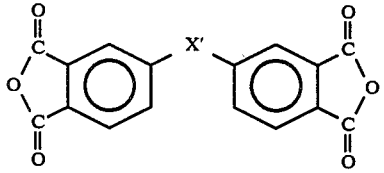

in which X' is a divalent moiety containing no aliphatic carbon-carbon or carbon-hydrogen bonds; and
   (2) A diamine reactant wherein
      c. 20–100 mole % of the diamine reactant corresponds to the formula:

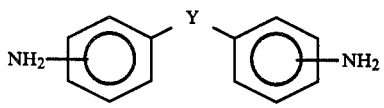

in which Y is a sulfone moiety; and
      d. 80–0 mole % of the diamine reactant corresponds to the formula:

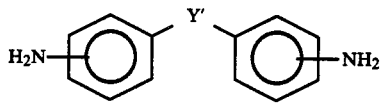

in which Y' is a nonelectron withdrawing moiety.

2. The polyimide of claim 1 in which X' is

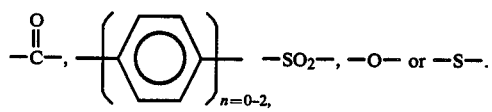

3. A method of making soluble polyimides comprising the steps of forming a uniform solution in aprotic solvent of approximately equimolar amounts of aromatic dianhydride and aromatic diamine consisting essentially of:

(1) A dianhydride reactant wherein
 a. 50–100 mole % of the dianhydride reactant corresponds to the formula:

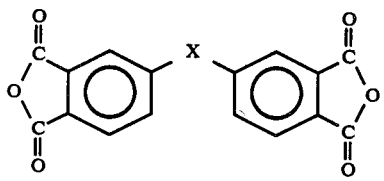

in which X is a 2,2-perfluoropropylene moiety;
 b. 50–0 mole % of the dianhydride reactant corresponds to the formula:

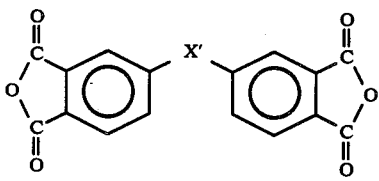

in which X' is a divalent moiety containing no aliphatic carbon-carbon or carbon-hydrogen bonds; and (2) A diamine reactant wherein
 c. 20–100 mole % of the diamine reactant corresponds to the formula:

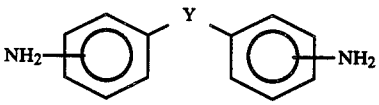

or mixtures thereof, in which Y is a sulfone moiety; and
 d. 80–0 mole % of the diamine reactant corresponds to the formula:

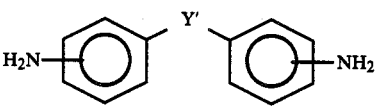

in which Y' is a nonelectron withdrawing moiety, whereby the dianhydride reactant and diamine reactant coreact to form polyamic acid; and e. adjusting the temperature of the reaction solution to 160°–200° C. to effect dehydration of the polyamic acid and formation of the corresponding polyimide.

4. The method of claim 3 in which the divalent moiety (X') of the dianhydride reactant b is

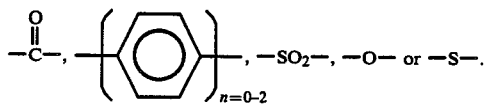

5. The polyimide of claim 1 in which the aprotic solvent is N-methyl pyrrolidone, dimethylacetamide dimethylsulfoxide or dimethylformamide.

6. The polyimide of claim 1 having an intrinsic viscosity of 0.7–0.8.

7. The polyimide of claim 1 in which the dianhydride reactant is a mixture of 50 mole % each of (a) and (b).

8. The polyimide of claim 7 in which the dianhydrides are

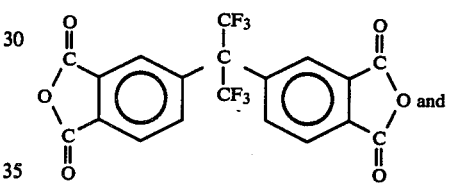

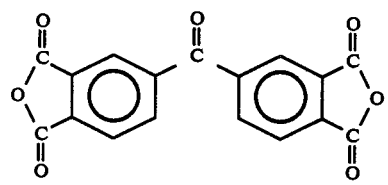

9. The polyimide of claim 1 in which dianhydride (a) is 100 mole % of the anhydride reactant.

10. The polyimide of claim 1 in which diamine (c) is at least 50 mole % of the diamine reactant.

11. The polyimide of claim 10 in which the diamine reactant is a mixture of 50 mole % each of (c) and (d).

12. The polyimide of claim 11 in which the diamine reactant is a mixture of 50 mole % each of

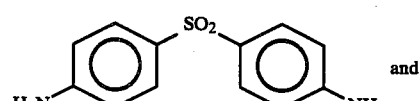

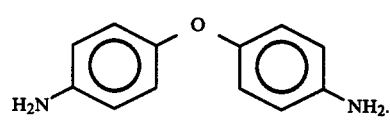

13. The polyimide of claim 10 in which diamine (c) is 100 mole % of the total diamine reactant.

14. The polyimide of claim 13 in which the diamine is

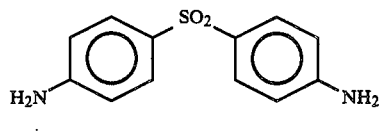
15. The polyimide of claim 7 in which diamine (c) is at least 50 mole % of the diamine reactant.
16. The polyimide of claim 8 in which the diamine reactant is a mixture of 50 mole % of each of (c) and (d).
17. The polyimide of claim 16 in which the diamine reactant is a mixture of 50 mole % each of
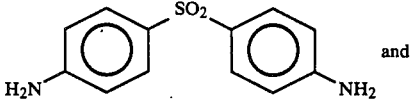
and
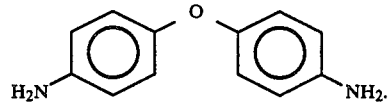
* * * * *